US011152126B2

(12) United States Patent
Mashio et al.

(10) Patent No.: US 11,152,126 B2
(45) Date of Patent: Oct. 19, 2021

(54) ABNORMALITY DIAGNOSIS SYSTEM AND ABNORMALITY DIAGNOSIS METHOD

(71) Applicant: MITSUBISHI HEAVY INDUSTRIES, LTD., Tokyo (JP)

(72) Inventors: Kenji Mashio, Tokyo (JP); Takae Yamashita, Tokyo (JP); Takashi Azuma, Tokyo (JP); Susumu Shiizuka, Tokyo (JP); Junichi Nishitani, Tokyo (JP); Masafumi Utsumi, Tokyo (JP); Jun Shibuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 210 days.

(21) Appl. No.: 15/580,357

(22) PCT Filed: Jun. 22, 2016

(86) PCT No.: PCT/JP2016/068559
§ 371 (c)(1),
(2) Date: Dec. 7, 2017

(87) PCT Pub. No.: WO2017/051575
PCT Pub. Date: Mar. 30, 2017

(65) Prior Publication Data
US 2018/0174694 A1    Jun. 21, 2018

(30) Foreign Application Priority Data

Sep. 25, 2015    (JP) .............................. JP2015-188600

(51) Int. Cl.
*G06N 7/00*        (2006.01)
*G21C 17/00*    (2006.01)
(Continued)

(52) U.S. Cl.
CPC ............ *G21C 17/00* (2013.01); *G05B 23/024* (2013.01); *G06N 7/005* (2013.01); *G21D 3/001* (2013.01)

(58) Field of Classification Search
CPC .. G05B 23/024; G05B 19/4183; G06N 7/005; G06N 20/00; G21C 17/00; G21D 3/001;
(Continued)

(56) References Cited

U.S. PATENT DOCUMENTS 5,210,704 A    5/1993  Husseiny
2006/0287068 A1*  12/2006  Walker .................... G07F 17/32
                                                                                     463/25
(Continued)

FOREIGN PATENT DOCUMENTS

CN    102495549 B    8/2013
JP    4-23131 A    1/1992
(Continued)

OTHER PUBLICATIONS

Extended (supplementary) European Search Report dated Jul. 2, 2018, issued in counterpart application No. 16848365.9. (26 pages).
(Continued)

*Primary Examiner* — Jeffrey P Aiello
(74) *Attorney, Agent, or Firm* — Westerman, Hattori, Daniels & Adrian, LLP

(57) ABSTRACT

This abnormality diagnosis system for diagnosing abnormalities in a plant is provided with: an abnormality diagnosis control unit which, with respect to an instrument parameter measured in a plant determined to have an indication of abnormality, predicts the development of the instrument parameter by extrapolation, and which generates an abnormality manifestation pattern that is a pattern of behavior of the instrument parameter after prediction; and a data storage unit which stores a plurality of abnormality
(Continued)

model patterns PA, PB that are patterns of behavior of the instrument parameters corresponding to causes CA1, CA2, CB1, CB2 of plant abnormality. The abnormality diagnosis control unit makes a matching determination between the abnormality manifestation pattern that has been generated and the plurality of abnormality model patterns PA, PB stored in the data storage unit, and identifies, as the cause of the abnormality in the abnormality manifestation pattern.

6 Claims, 5 Drawing Sheets

(51) Int. Cl.
*G21D 3/00* (2006.01)
*G05B 23/02* (2006.01)

(58) Field of Classification Search
CPC . G06F 16/9024; G06F 11/079; G06K 9/6262; C12Q 1/6827; Y02E 30/00; Y02E 30/30
USPC .............................. 702/34, 35, 181, 182, 183
See application file for complete search history.

(56) References Cited

U.S. PATENT DOCUMENTS

| | | | |
|---|---|---|---|
| 2007/0174010 A1* | 7/2007 | Bhat | ................ G06T 13/00 702/66 |
| 2007/0220368 A1 | 9/2007 | Jaw et al. | |
| 2008/0018792 A1* | 1/2008 | Bhat | ................ G06T 13/40 348/578 |
| 2012/0075463 A1* | 3/2012 | Chen | ................ G01S 11/12 348/135 |
| 2013/0166572 A1* | 6/2013 | Fujimaki | ................ G16H 70/40 707/748 |
| 2014/0058705 A1* | 2/2014 | Brill | ................ G06Q 10/063 702/183 |
| 2014/0271538 A1* | 9/2014 | Buchner | ................ C07K 14/53 424/85.1 |
| 2015/0371544 A1* | 12/2015 | Mere | ................ G08G 5/0039 701/3 |
| 2016/0091871 A1* | 3/2016 | Marti | ................ G06F 3/01 702/188 |
| 2016/0269861 A1* | 9/2016 | Buil | ................ H04M 1/7253 |

FOREIGN PATENT DOCUMENTS

| | | |
|---|---|---|
| JP | 8-220279 A | 8/1996 |
| JP | 11-344589 A | 12/1999 |
| JP | 2011-90382 A | 5/2011 |

OTHER PUBLICATIONS

International Search Report dated Jul. 19, 2016, issued in counterpart International Application No. PCT/JP2016/068559 (1 page).

* cited by examiner

FIG. 4

| | MEASUREMENT PARAMETER B | | | |
|---|---|---|---|---|
| | MEASUREMENT PARAMETER A | | | |
| ABNORMALITY MODEL PATTERN PA | | ABNORMALITY CAUSE CA1 | OCCURRENCE PROBABILITY OA1 | |
| | | ABNORMALITY CAUSE CA2 | OCCURRENCE PROBABILITY OA2 | |
| | | ⋮ | ⋮ | |
| ABNORMALITY MODEL PATTERN PB | | ABNORMALITY CAUSE CB1 | OCCURRENCE PROBABILITY OB1 | |
| | | ABNORMALITY CAUSE CB2 | OCCURRENCE PROBABILITY OB2 | |
| | | ⋮ | ⋮ | |
| ⋮ | ⋮ | ⋮ | ⋮ | |

ABNORMALITY DIAGNOSIS SYSTEM AND ABNORMALITY DIAGNOSIS METHOD

TECHNICAL FIELD

The present invention relates to an abnormality diagnosis system and an abnormality diagnosis method for diagnosing abnormality in a plant.

BACKGROUND ART

In the related art, there is a monitoring system which can automate a series of processes from monitoring of an abnormality predict to failure diagnosis in a monitoring target (for example, refer to PTL 1). The monitoring system calculates a Mahalanobis distance of monitoring target data, and detects abnormality in a monitoring target on the basis of the calculated Mahalanobis distance. The monitoring system extracts monitoring target data in which an abnormality predict appears, as an abnormality signal, extracts monitoring target data related to the abnormality signal as a related signal, and generates a predetermined input signal on the basis of the abnormality signal and the related signal. The monitoring system diagnoses a failure in the monitoring target by using a Bayesian network on the basis of the input signal.

CITATION LIST

Patent Literature

[PTL 1] Japanese Unexamined Patent Application Publication No. 2011-90382

SUMMARY OF INVENTION

Technical Problem

However, in the monitoring system disclosed in PTL 1, since failure diagnosis is performed on the basis of an abnormality signal and a related signal, a pattern of behaviors of the abnormality signal is not taken into consideration, and thus the failure diagnosis is performed by using all abnormality signals so that it is hard to reduce a diagnosis process load. The monitoring system is required to calculate a Mahalanobis distance in order to detect an abnormality predict, and thus a computation load is high.

Therefore, an object of the present invention is to provide an abnormality diagnosis system and an abnormality diagnosis method capable of rapidly diagnosing abnormality in a plant.

Solution to Problem

According to the present invention, there is provided an abnormality diagnosis system diagnosing abnormality in a plant, including an abnormality diagnosis control unit that predicts the development of an instrument parameter through extrapolation with respect to the instrument parameter measured in the plant and determined as there being an abnormality predict, and generates an abnormality symptom motion pattern which is a pattern of a behavior of the instrument parameter after prediction; and a data storage unit that stores a plurality of abnormality model patterns which are patterns of a behavior of the instrument parameter corresponding to an abnormality cause of the plant, in which the abnormality diagnosis control unit determines whether or not the generated abnormality symptom motion pattern matches the plurality of abnormality model patterns stored in the data storage unit, and specifies the abnormality cause of the abnormality model pattern determined as matching the abnormality symptom motion pattern, as the abnormality cause of the abnormality symptom motion pattern.

According to the present invention, there is provided an abnormality diagnosis method of diagnosing abnormality in a plant, including causing an abnormality diagnosis control unit to predict the development of an instrument parameter through extrapolation with respect to the instrument parameter measured in the plant and determined as there being an abnormality predict, and to generate an abnormality symptom motion pattern which is a pattern of a behavior of the instrument parameter after prediction; and causing a data storage unit to store a plurality of abnormality model patterns which are patterns of a behavior of the instrument parameter corresponding to an abnormality cause of the plant, in which the abnormality diagnosis control unit determines whether or not the generated abnormality symptom motion pattern matches the plurality of abnormality model patterns stored in the data storage unit, and specifies the abnormality cause of the abnormality model pattern determined as matching the abnormality symptom motion pattern, as the abnormality cause of the abnormality symptom motion pattern.

According to this configuration, it is possible to rapidly specify an abnormality cause of the plant by determining whether or not an abnormality symptom motion pattern matches an abnormality model pattern. In this case, since the abnormality symptom motion pattern is obtained by predicting the development of an instrument parameter determined as there being an abnormality predict through extrapolation, an abnormality cause can be specified in a stage of the abnormality predict, and thus it is possible to diagnose an abnormality cause of the plant early.

Preferably, the abnormality symptom motion pattern of the instrument parameter is correlated with both a plurality of the abnormality causes and occurrence probabilities of the respective abnormality causes.

According to this configuration, it is possible to specify a plurality of abnormality causes occurring in the plant, and also to specify an occurrence probability of each abnormality cause, on the basis of the abnormality symptom motion pattern.

Preferably, the data storage unit stores a statistical model which is built on the basis of the abnormality cause correlated with the abnormality symptom motion pattern and an occurrence probability of the abnormality cause, and, in a case where there are a plurality of the abnormality symptom motion patterns of the instrument parameter, the abnormality diagnosis control unit specifies the abnormality cause and an occurrence probability of the abnormality cause on the basis of the plurality of abnormality symptom motion patterns by using the statistical model.

According to this configuration, an abnormality cause of the plant and an occurrence probability thereof can be specified on the basis of a plurality of abnormality symptom motion patterns by using a statistical model, and thus it is possible to perform abnormality diagnosis with high accuracy.

Preferably, the statistical model is a Bayesian network.

According to this configuration, since an established statistical mode can be used, it is possible to increase the reliability of an abnormality cause and an occurrence probability thereof specified by using the Bayesian network.

Preferably, in specifying the abnormality cause, the abnormality diagnosis control unit specifies the abnormality cause and an occurrence probability of the abnormality cause by using the statistical model on the basis of the abnormality symptom motion pattern of the instrument parameter, and a normal pattern which is a pattern of a behavior of the instrument parameter in which there is no abnormality predict.

According to this configuration, it is possible to specify an abnormality cause and an occurrence probability thereof by using a statistical model on the basis of an abnormality symptom motion pattern and a normal pattern, and thus to perform abnormality diagnosis with higher accuracy.

BRIEF DESCRIPTION OF DRAWINGS

FIG. 4 is a diagram for explaining abnormality model patterns of an instrument parameter, and abnormality causes corresponding to the abnormality model pattern.

DESCRIPTION OF EMBODIMENTS

Hereinafter, an embodiment of the present invention will be described in detail with reference to the drawings. The invention is not limited to the embodiment. Constituent elements in the following embodiment include constituent elements which can be easily replaced by a person skilled in the art, or the substantially same constituent elements. Constituent elements described below may be combined with each other as appropriate, and, in a case where there are a plurality of embodiments, the embodiments may be combined with each other.

Embodiment

Figure 1:
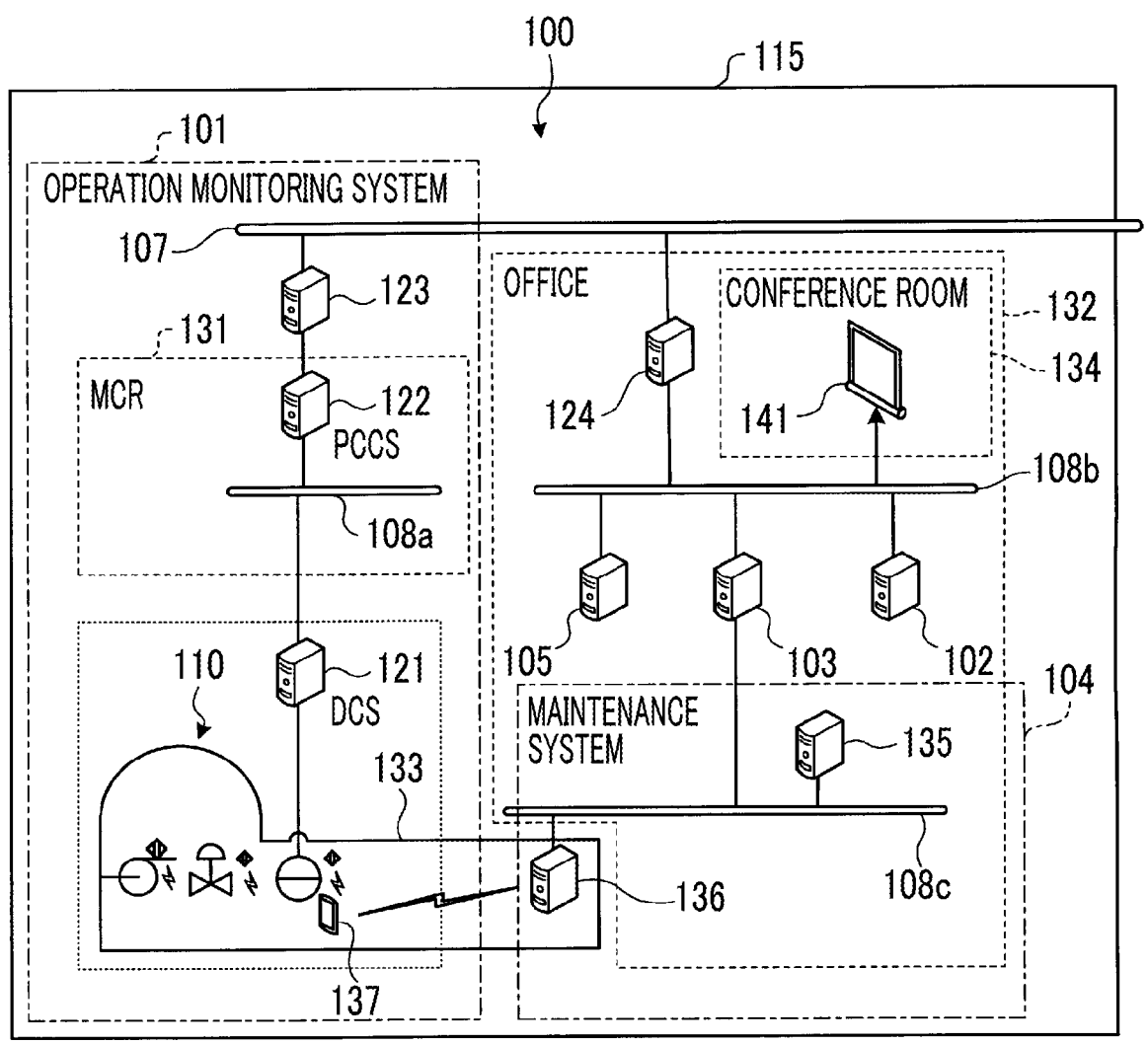
FIG. 1 is a schematic configuration diagram illustrating a nuclear power plant system including an abnormality diagnosis system according to the present embodiment.

FIG. 1 is a schematic configuration diagram illustrating a nuclear power plant system including an abnormality diagnosis system according to the present embodiment. As illustrated in FIG. 1, an abnormality diagnosis system 103 according to the present embodiment is incorporated into a nuclear power plant system 100 used to operate a nuclear power plant. Here, the nuclear power plant is, for example, a nuclear power generation plant 110 having a reactor, and the nuclear power generation plant 110 is controlled to perform a base-load operation, and is provided in a site 115. First, with reference to FIG. 1, prior to a description of the abnormality diagnosis system 103, the nuclear power plant system 100 will be described. In the present embodiment, the nuclear power generation plant 110 will be described as an example of a plant, but this is only an example, and the present embodiment may be applied to plants (for example, a chemical plant or a thermal power generation plant) other than a nuclear power plant.

As illustrated in FIG. 1, the nuclear power plant system 100 includes a plant monitoring system 101, a plant abnormality predict detection system 102, the abnormality diagnosis system 103, a plant maintenance system 104, and a plant operation historian database 105. In the nuclear power plant system 100, the respective systems 101, 102, 103 and 104 and the plant operation historian database 105 are communicably connected to each other via a station bus 107 and a plurality of unit buses 108a, 108b and 108c.

The plant monitoring system 101 monitors and controls an operation of the nuclear power generation plant 110. The plant monitoring system 101 includes a distributed control system (DCS) 121, a process control computer system (PCCS) 122, and a gateway 123.

The distributed control system 121 is controllably connected to the nuclear power generation plant 110, and is configured to include a plurality of control devices to which a plurality of control functions are distributed. The distributed control system 121 is a system controlling operations of respective equipment such as pumps and valves (not illustrated) provided in the nuclear power generation plant 110. The distributed control system 121 controls an operation of the nuclear power generation plant 110 by controlling operations of the respective equipment on the basis of a control signal from the process control computer system 122. The distributed control system 121 is connected to a plurality of measurement equipment provided in the nuclear power generation plant 110, acquires a plurality of instrument parameters which are respectively output from the plurality of measurement equipment as plant operation data, and outputs the acquired plant operation data to the process control computer system 122.

The process control computer system 122 is connected to the distributed control system 121 via the unit bus 108a, and is provided in a main control room (MCR) 131 separated from a building 133 in which the nuclear power generation plant 110 is provided. The process control computer system 122 acquires the plant operation data which is input from the distributed control system 121, and also outputs a control signal for controlling an operation of the nuclear power generation plant 110 to the distributed control system 121. The process control computer system 122 outputs the plant operation data acquired from the distributed control system 121, to the plant operation historian database 105 via the gateway 123 and the station bus 107.

The gateway 123 is provided between the process control computer system 122 and the station bus 107, and is thus connected to the process control computer system 122 and the station bus 107. The gateway 123 permits the plant operation data to be output from the process control computer system 122, and also restricts data from other systems from being input to the process control computer system 122.

The plant monitoring system 101 acquires plant operation data from the nuclear power generation plant 110, and monitors the acquired plant operation data. The plant monitoring system 101 causes the nuclear power generation plant 110 to perform a base-load operation so that a plurality of an instrument parameter included in the acquired plant operation data reach predefined target values. As mentioned above, the nuclear power generation plant 110 performs a base-load operation so that a target value reaches a steady-state value.

The plant operation historian database 105 is connected to the station bus 107 via the unit bus 108b and a gateway 124. In other words, the gateway 124 is provided between the unit bus 108b and the station bus 107 so as to be connected to the unit bus 108b and the station bus 107, and the plant operation historian database 105 is connected to the unit bus 108b. The plant operation historian database 105 is provided in an office 132 separated from the building 133 in which the nuclear power generation plant 110 is provided. The plant operation historian database 105 accumulates plant operation data output from the distributed control system 121 so as to preserve the history of the plant operation data. The plant operation historian database 105 can output plant operation data in response to requests from the abnormality diagnosis system 103 and the plant maintenance system 104.

The plant abnormality predict detection system 102 is connected to the unit bus 108b, and can thus acquire plant operation data output from the plant operation historian database 105, via the unit bus 108b. The plant abnormality predict detection system 102 can acquire plant operation data output from the distributed control system 121 in real time. The plant abnormality predict detection system 102 compares a normal range which is set on the basis of the past plant operation data preserved in the plant operation historian database 105 with the present plant operation data acquired in real time, and detects an abnormality predict of the nuclear power generation plant 110 in a case where the plant operation data exceeds the normal range W. The plant abnormality predict detection system 102 is connected to the unit bus 108b, and can thus output plant abnormality symptom indication data which is data regarding the detected abnormality predict to the abnormality diagnosis system 103.

The abnormality diagnosis system 103 is connected to the unit bus 108b, and can thus acquire plant abnormality symptom indication data output from the plant abnormality predict detection system 102, via the unit bus 108b. The abnormality diagnosis system 103 specifies a facility or a machine causing abnormality among various facilities and various equipment forming the nuclear power generation plant 110 on the basis of the plant abnormality symptom indication data. The abnormality diagnosis system 103 is connected to the unit bus 108c, and can thus output a diagnosis result regarding the specified facility or machine to the plant maintenance system 104 as maintenance data.

The plant maintenance system 104 is a system for maintenance of the nuclear power generation plant 110. The plant maintenance system 104 acquires the maintenance data of the nuclear power generation plant 110 diagnosed by the abnormality diagnosis system 103, and provides the acquired maintenance data to a maintenance worker, or acquires and accumulates maintenance inspection results obtained due to inspection work or the like performed by the maintenance worker as maintenance data. The plant maintenance system 104 includes a maintenance database 135, a maintenance management terminal 136, and a maintenance portable terminal 137.

The maintenance database 135 is provided in the office 132, and is connected to the unit bus 108c. The maintenance database 135 outputs maintenance data to the abnormality diagnosis system 103, accumulates maintenance data which is input from the maintenance management terminal 136 and the maintenance portable terminal 137, and outputs the maintenance data acquired from the abnormality diagnosis system 103 to the maintenance management terminal 136.

The maintenance management terminal 136 is provided in the building 133 in which the nuclear power generation plant 110 is provided and which is a non-management zone, and is connected to the unit bus 108c. The maintenance management terminal 136 outputs maintenance data acquired from the maintenance database 135 to the maintenance worker, or outputs maintenance data which is input by the maintenance worker to the maintenance database 135. The maintenance management terminal 136 may be provided in the office 132.

The maintenance portable terminal 137 is carried by the maintenance worker, and can perform wireless communication with the maintenance management terminal 136. Maintenance inspection results obtained through inspection work and visual inspection performed by the maintenance worker are input to the maintenance portable terminal 137 as maintenance data by the maintenance worker. The maintenance portable terminal 137 outputs the input maintenance data to the maintenance management terminal 136 through wireless communication. In this case, the maintenance management terminal 136 and the maintenance portable terminal 137 are provided in the building 133, and thus the wireless communication between the maintenance management terminal 136 and the maintenance portable terminal 137 is performed in the building 133.

In the nuclear power plant system 100, the respective systems 101, 102, 103 and 104 and the plant operation historian database 105 are connected to each other via the buses 107, 108a, 108b and 108c, and thus various pieces of data obtained by the respective systems 101, 102, 103 and 104 can be shared, and the shared various pieces of data can be processed.

In the nuclear power plant system 100, a large information terminal 141 is provided in a conference room 134 of the office 132, and the large information terminal 141 is connected to the unit bus 108b. The large information terminal 141 can display not only the maintenance data accumulated in the plant maintenance system 104 but also the data acquired in the respective systems 101, 102 and 103.

Figure 2:
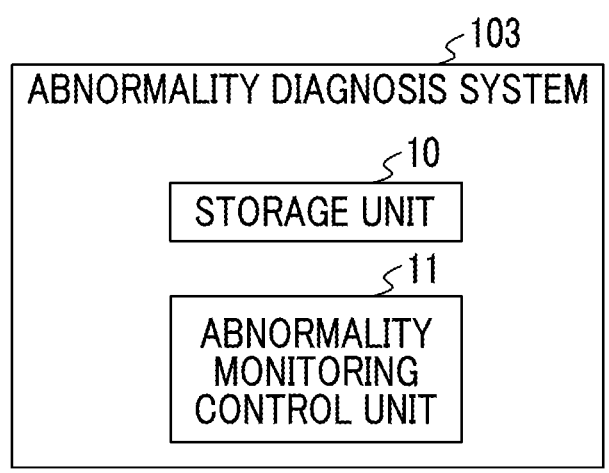
FIG. 2 is a schematic configuration diagram illustrating the abnormality diagnosis system according to the present embodiment.
Figure 3:
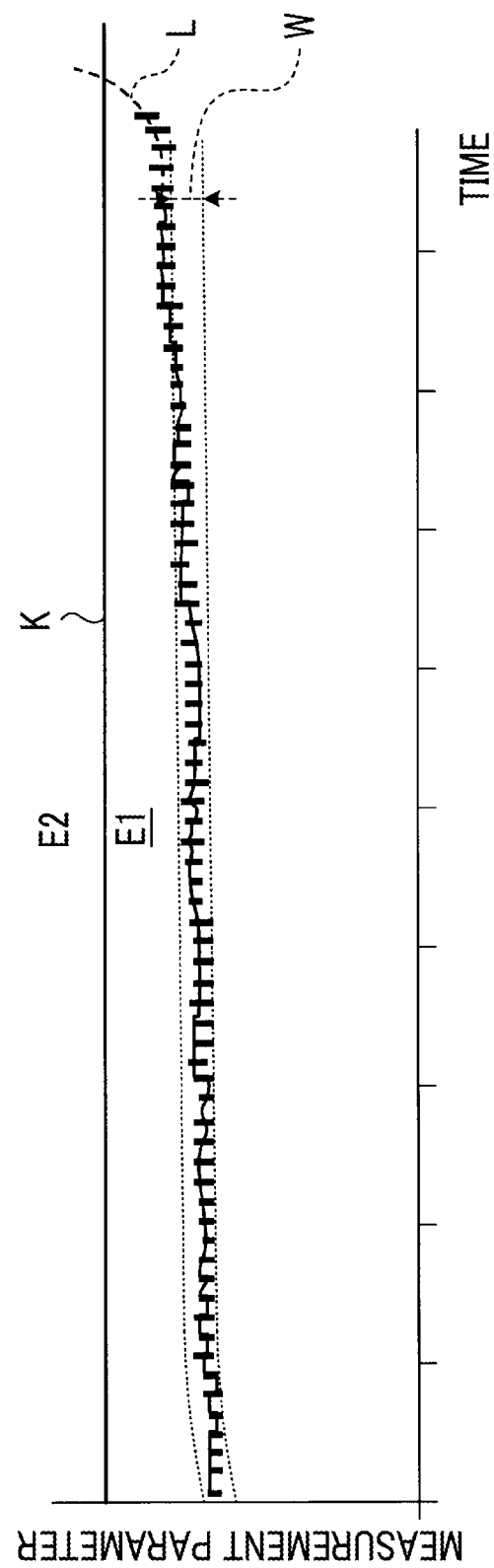
FIG. 3 is a diagram for explaining an instrument parameter.

Next, with reference to FIGS. 2 and 3, the abnormality diagnosis system 103 will be described. FIG. 2 is a schematic configuration diagram illustrating the abnormality diagnosis system according to the present embodiment. FIG. 3 is a diagram for explaining an instrument parameter.

The abnormality diagnosis system 103 is formed by using a hardware resource such as a computer including a data storage unit 10 and an abnormality diagnosis control unit 11. The abnormality diagnosis system 103 acquires plant abnormality symptom indication data output from the plant abnormality predict detection system 102, and performs abnormality diagnosis for the nuclear power generation plant 110 on the basis of the acquired plant abnormality symptom indication data.

Here, a description will be made of plant abnormality symptom indication data output from the plant abnormality predict detection system 102 with reference to FIG. 3. FIG. 3 is a diagram for explaining an instrument parameter. As described above, a normal range W which is a range in which plant operation data transitions normally on the basis of the past plant operation data preserved in the plant operation historian database 105 is set in the plant abnormality predict detection system 102. The plant abnormality predict detection system 102 determines whether or not the present plant operation data acquired in real time transitions in the normal range W. Here, an instrument parameter is divided into a normality determination range E1 in which the instrument parameter is normal and an abnormality determination range E2 in which the instrument parameter is abnormal by an alarm threshold K as a threshold value for determining the presence or absence of abnormality, and the normal range W is set in the normality determination range E1. Thus, the plant abnormality predict detection system 102 detects whether or not there is an indication of abnormality in the nuclear power generation plant 110 although the nuclear power generation plant 110 is not abnormal.

As mentioned above, an instrument parameter in which it is determined by the plant abnormality predict detection system 102 that there is an abnormality predict shows a behavior of exceeding the normal range W toward the alarm threshold K, and this instrument parameter is input to the abnormality diagnosis system 103 as plant abnormality symptom indication data.

The data storage unit 10 of the abnormality diagnosis system 103 is formed by using hardware resources such as a memory and a storage device, and stores not only the acquired plant abnormality symptom indication data but also an abnormality model pattern, and a Bayesian network as a statistical model.

The abnormality model pattern is a pattern of a behavior of an instrument parameter which transitions according to an abnormality cause of the nuclear power generation plant 110. A plurality of abnormality model patterns which are provided according to various abnormality causes are correlated with abnormality causes, and are also correlated with occurrence probabilities of the abnormality causes. With reference to FIG. 4, a description will be made of an abnormality model pattern corresponding to an instrument parameter. FIG. 4 is a diagram for explaining an abnormality model pattern of an instrument parameter, and an abnormality cause corresponding to the abnormality model pattern. As illustrated in FIG. 4, for example, two or more abnormality model patterns PA and PB are prepared for an instrument parameter A. One abnormality model pattern PA is correlated with a plurality of abnormality causes CA1 and CA2, and the plurality of abnormality causes CA1 and CA2 are respectively correlated with a plurality of occurrence probabilities OA1 and OA2. The other abnormality model pattern PB is correlated with a plurality of abnormality causes CB1 and CB2, and the plurality of abnormality causes CB1 and CB2 are respectively correlated with a plurality of occurrence probabilities OB1 and OB2. In FIG. 4, the instrument parameter A is an example, and there is a case where the number of abnormality model patterns is one, and the number of abnormality causes is one.

Figure 5:
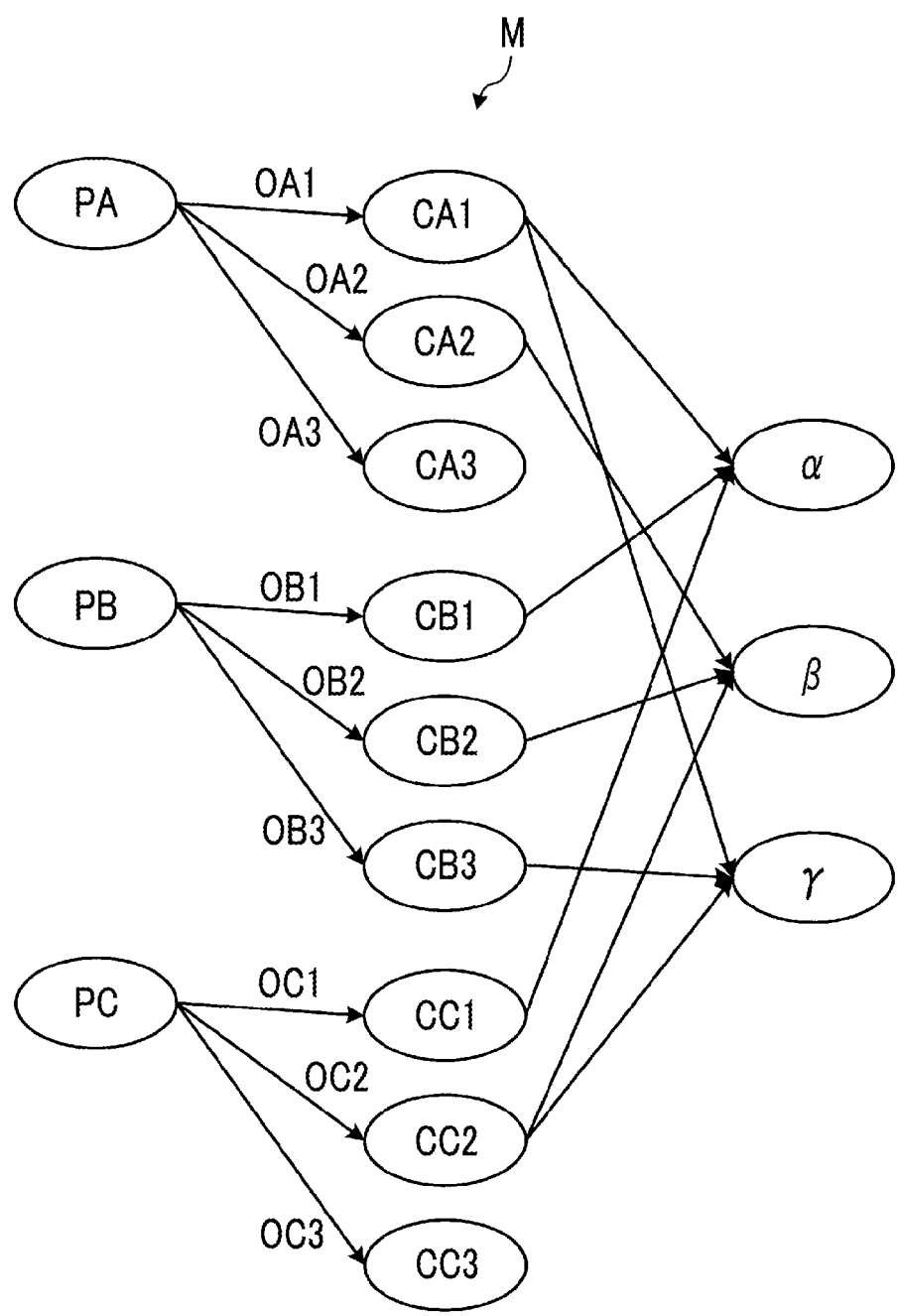
FIG. 5 is a diagram for explaining a Bayesian network.

The Bayesian network is a statistical model built on the basis of a plurality of abnormality model patterns corresponding to abnormality causes and occurrence probabilities of abnormality causes correlated with the plurality of abnormality model patterns. With reference to FIG. 5, a description will be made of an example of the Bayesian network. FIG. 5 is a diagram for explaining the Bayesian network. In a case where there are a plurality of instrument parameters determined as there being an abnormality predict, a Bayesian network M is a model for deriving an abnormality cause and an occurrence probability of the abnormality cause on the basis of the plurality of instrument parameters. As illustrated in FIGS. 4 and 5, the abnormality model pattern PA is correlated with abnormality causes CA1 to CA3, and, similarly, abnormality model patterns PB and PC are respectively correlated with abnormality causes CB1 to CB3 and CC1 to CC3. Abnormality causes further include abnormality causes $\alpha$, $\beta$, and $\gamma$, and the abnormality causes $\alpha$, $\beta$, and $\gamma$ are correlated with the abnormality causes CA1 to CA3, CB1 to CB3, and CC1 to CC3. Specifically, the abnormality cause $\alpha$ is correlated with the abnormality cause CA1, the abnormality cause CB1, and the abnormality cause CC1, and an occurrence probability of the abnormality cause $\alpha$ is obtained by taking into consideration the presence or absence and occurrence probabilities of the abnormality cause CA1, the abnormality cause CB1, and the abnormality cause CC1. This is also the same for the abnormality cause $\beta$ and the abnormality cause $\gamma$ as illustrated in FIG. 4.

The abnormality diagnosis control unit 11 generates an abnormality symptom motion pattern on the basis of plant abnormality symptom indication data. As described above, the plant abnormality symptom indication data is an instrument parameter showing a behavior of exceeding the normal range W toward the alarm threshold K, and thus the abnormality diagnosis control unit 11 generates a prediction model L (refer to FIG. 3) obtained by predicting the development of the instrument parameter according to an extrapolation method with respect to the instrument parameter. The abnormality diagnosis control unit 11 generates a pattern of a behavior of the instrument parameter of the prediction model L as an abnormality symptom motion pattern.

The abnormality diagnosis control unit 11 determines whether or not the generated abnormality symptom motion pattern matches an abnormality model pattern stored in the data storage unit 10, so as to specify an abnormality cause of the nuclear power generation plant 110. Specifically, the abnormality diagnosis control unit 11 determines whether or not an abnormality symptom motion pattern of a predetermined instrument parameter matches any of a plurality of abnormality model patterns corresponding to the predetermined instrument parameter. The abnormality diagnosis control unit 11 specifies an abnormality cause corresponding to an abnormality model pattern determined as matching, as an abnormality cause of an abnormality symptom motion pattern, also specifies an occurrence probability corresponding to the specified abnormality cause, and outputs the specified results as diagnosis results. In this case, in a case where there are a plurality of abnormality causes corresponding to the abnormality model pattern, the abnormality diagnosis control unit 11 specifies an occurrence probability corresponding to each abnormality cause along with the plurality of abnormality causes by using the Bayesian network illustrated in FIG. 5. The abnormality diagnosis system 103 outputs the diagnosis results to the maintenance database 135 as maintenance data.

As mentioned above, according to the present embodiment, the abnormality diagnosis control unit 11 determines whether or not an abnormality symptom motion pattern matches an abnormality model pattern, and can specify an abnormality cause of the nuclear power generation plant 110 by using an abnormality symptom motion pattern determined as matching. Thus, the abnormality diagnosis control unit 11 has only to use an abnormality symptom motion pattern of an instrument parameter determined as matching without using a plurality of instrument parameters, and can thus reduce a load related to a diagnosis process and rapidly specify an abnormality cause of the nuclear power generation plant 110. In this case, since the abnormality symptom motion pattern is obtained by predicting the development of an instrument parameter determined as there being an abnormality predict through extrapolation, an abnormality cause can be specified in a stage of the abnormality predict, and thus it is possible to diagnose an abnormality cause of the nuclear power generation plant 110 early.

According to the present embodiment, a plurality of abnormality causes occurring in the nuclear power generation plant 110 can be specified on the basis of an abnormality symptom motion pattern, and an occurrence probability of each abnormality cause can be specified.

According to the present embodiment, an abnormality cause of the nuclear power generation plant 110 and an occurrence probability thereof can be specified on the basis of a plurality of abnormality symptom motion patterns by using the Bayesian network M, and thus it is possible to perform abnormality diagnosis with high accuracy.

According to the present embodiment, since an established statistical model can be used by using the Bayesian network M as a statistical model, it is possible to increase the reliability of an abnormality cause and an occurrence probability thereof specified by using the Bayesian network M.

In the present embodiment, an abnormality cause of the nuclear power generation plant 110 and an occurrence probability thereof can be specified on the basis of a plurality of abnormality symptom motion patterns by using the Bayesian network M, but this configuration is only an example. For example, the abnormality diagnosis system 103 may specify an abnormality cause and an occurrence probability of the abnormality cause by using the Bayesian network M on the basis of an abnormality symptom motion pattern and a normal pattern which is a pattern of a behavior of an instrument parameter in which there is no abnormality predict. In this case, the Bayesian network M is built on the basis of an abnormality cause correlated with the abnormality symptom motion pattern and an occurrence probability of the abnormality cause, and an abnormality cause correlated with the normal pattern and an occurrence probability of the abnormality cause. According to this configuration, the abnormality diagnosis system 103 can specify an abnormality cause and an occurrence probability thereof by using the Bayesian network M on the basis of an abnormality symptom motion pattern and a normal pattern, and can thus perform abnormality diagnosis with higher accuracy.

In the present embodiment, the Bayesian network M is used as a statistical model, but this configuration is only an example, and other statistical models may be used.

REFERENCE SIGNS LIST

10 DATA STORAGE UNIT
11 ABNORMALITY DIAGNOSIS CONTROL UNIT
100 NUCLEAR POWER PLANT SYSTEM
101 PLANT MONITORING SYSTEM
102 PLANT ABNORMALITY PREDICT DETECTION SYSTEM
103 ABNORMALITY DIAGNOSIS SYSTEM
104 PLANT MAINTENANCE SYSTEM
105 PLANT OPERATION HISTORIAN DATABASE
107 STATION BUS
108a, 108b, AND 108c UNIT BUS
110 NUCLEAR POWER GENERATION PLANT
115 SITE
121 DISTRIBUTED CONTROL SYSTEM
122 PROCESS CONTROL COMPUTER SYSTEM
123 GATEWAY
124 GATEWAY
131 MAIN CONTROL ROOM
132 OFFICE
133 BUILDING
134 CONFERENCE ROOM
135 MAINTENANCE DATABASE
136 MAINTENANCE MANAGEMENT TERMINAL
137 MAINTENANCE PORTABLE TERMINAL
141 LARGE INFORMATION TERMINAL
W NORMAL RANGE
K ALARM THRESHOLD
E1 NORMALITY DETERMINATION RANGE
E2 ABNORMALITY DETERMINATION RANGE
M BAYESIAN NETWORK

The invention claimed is:

1. An abnormality diagnosis system diagnosing abnormality in a nuclear power plant provided in a building, comprising:

an abnormality diagnosis control unit configured to
obtain an instrument parameter; wherein the instrument parameter is determined as there being an abnormality predict by the abnormality diagnosis control unit among a plurality of instrument parameters defined as measured values output respectively from a plurality of measurement equipment provided in the plant, and determine that the instrument parameter exceeds a normal range;
perform an extrapolation on the instrument parameter, wherein the instrument parameter does not exceed an alarm threshold;
generate an abnormality symptom motion pattern based on the extrapolation and the instrument parameter to indicate a predicted development, wherein the abnormality symptom motion pattern is a behavior pattern of an extrapolated line of the predicted development;
execute an abnormality diagnosis based on the abnormality symptom motion pattern and determine an abnormality cause by matching the abnormality symptom motion pattern with an abnormality model pattern among a plurality of abnormality model patterns, without using the plurality of instrument parameters to reduce a diagnosis processing load of the nuclear plant;
a data storage unit configured to store, with respect to the plurality of the instrument parameters, the plurality of the abnormality model patterns which are behavior patterns of the instrument parameter corresponding to abnormality causes of the plant,
wherein,
the abnormality diagnosis system is provided in an office separated from the building,
a maintenance management terminal and a maintenance portable terminal are provided in the building,
the plant, the abnormality diagnosis system, and the maintenance management terminal, are connected via buses, and
the maintenance portable terminal is carried by a user in the building and performs wireless communication with the maintenance management terminal.

2. The abnormality diagnosis system according to claim 1, wherein the abnormality symptom motion pattern of the instrument parameter is correlated with both the abnormality causes and occurrence probabilities of the abnormality causes.

3. The abnormality diagnosis system according to claim 2, wherein the data storage unit stores a statistical model which is built on the basis of the abnormality cause correlated with the abnormality symptom motion pattern and an occurrence probability of the abnormality cause.

4. The abnormality diagnosis system according to claim 3, wherein there are a plurality of the abnormality symptom motion patterns of the instrument parameter, the abnormality diagnosis control unit specifies the abnormality cause and the occurrence probability of the abnormality cause on the basis of the plurality of abnormality symptom motion patterns by using the statistical model.

5. The abnormality diagnosis system according to claim 3, wherein the statistical model is a Bayesian network.

6. The abnormality diagnosis system according to claim 3, wherein the abnormality diagnosis control unit specifies the abnormality cause and the occurrence probability of the abnormality cause by using the statistical model on the basis of the abnormality symptom motion pattern of the instrument parameter, and a normal pattern which is a pattern of a behavior of the instrument parameter in which there is no abnormality predict.

* * * * *